United States Patent [19]
Schneerer

[11] 3,838,743
[45] Oct. 1, 1974

[54] COLLAPSIBLE PLATFORM SCALE
[75] Inventor: Elmer C. Schneerer, Fairview Park, Ohio
[73] Assignee: Northern Ohio Scale Co., Cleveland, Ohio
[22] Filed: Mar. 1, 1974
[21] Appl. No.: 447,163

[52] U.S. Cl. .............................. 177/127, 177/258
[51] Int. Cl. ..................... G01g 21/28, G01g 21/08
[58] Field of Search ............ 177/126, 127, 258, 259

[56] References Cited
UNITED STATES PATENTS

| | | | |
|---|---|---|---|
| 1,628,205 | 5/1927 | Weber | 177/127 |
| 1,660,820 | 2/1928 | Shively | 177/258 |
| 3,596,725 | 8/1971 | Homs | 177/126 |
| 3,743,040 | 7/1973 | Hutchinson et al. | 177/126 |

*Primary Examiner*—George H. Miller, Jr.
*Attorney, Agent, or Firm*—Thomas M. Schmitz

[57] ABSTRACT

A collapsible platform scale having an upright structure assembly and movable parts outside of the platform box adapted to be readily disassembled and contained within the platform box which functions as a shipping container for shipping purposes.

9 Claims, 7 Drawing Figures

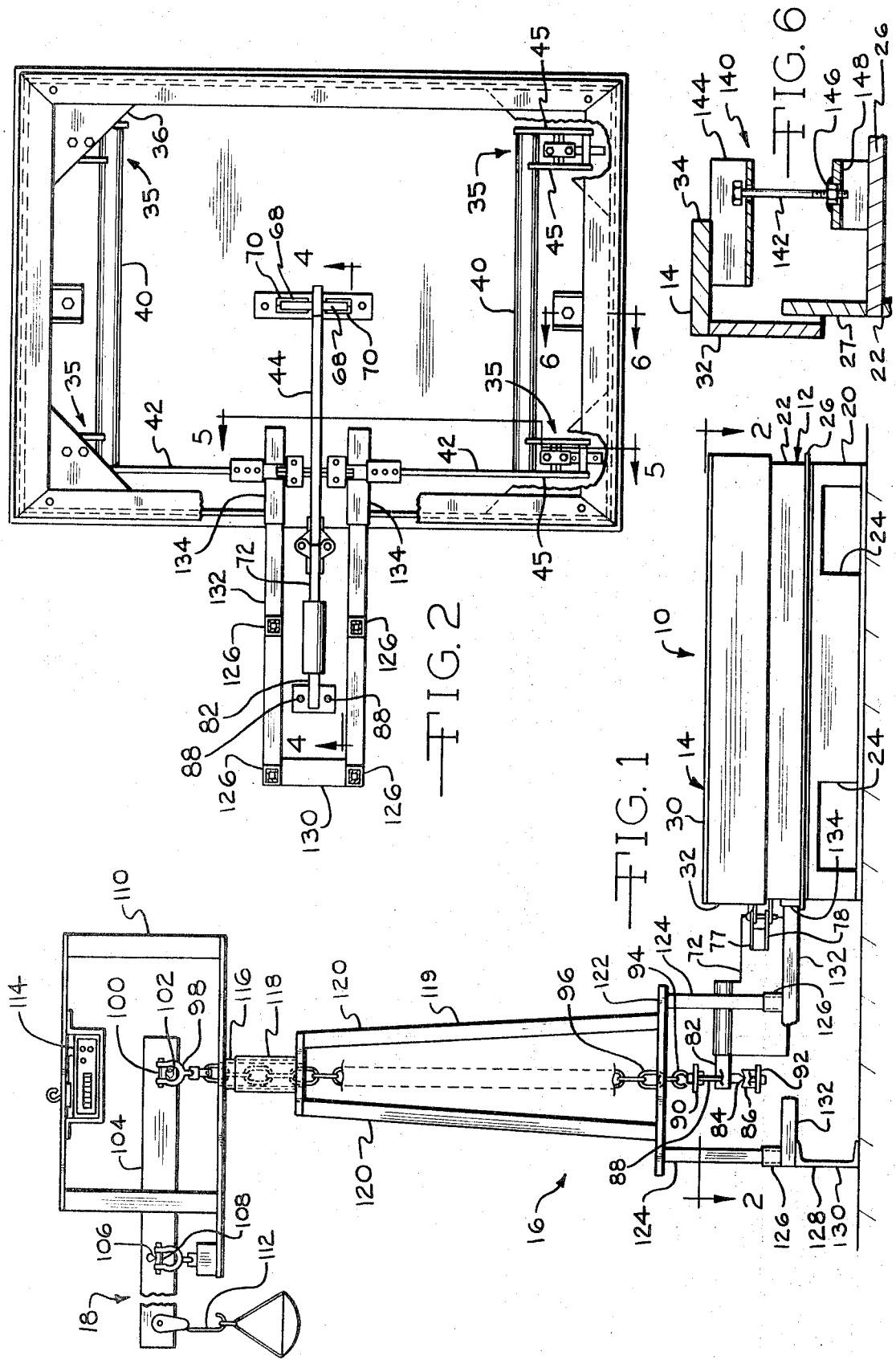

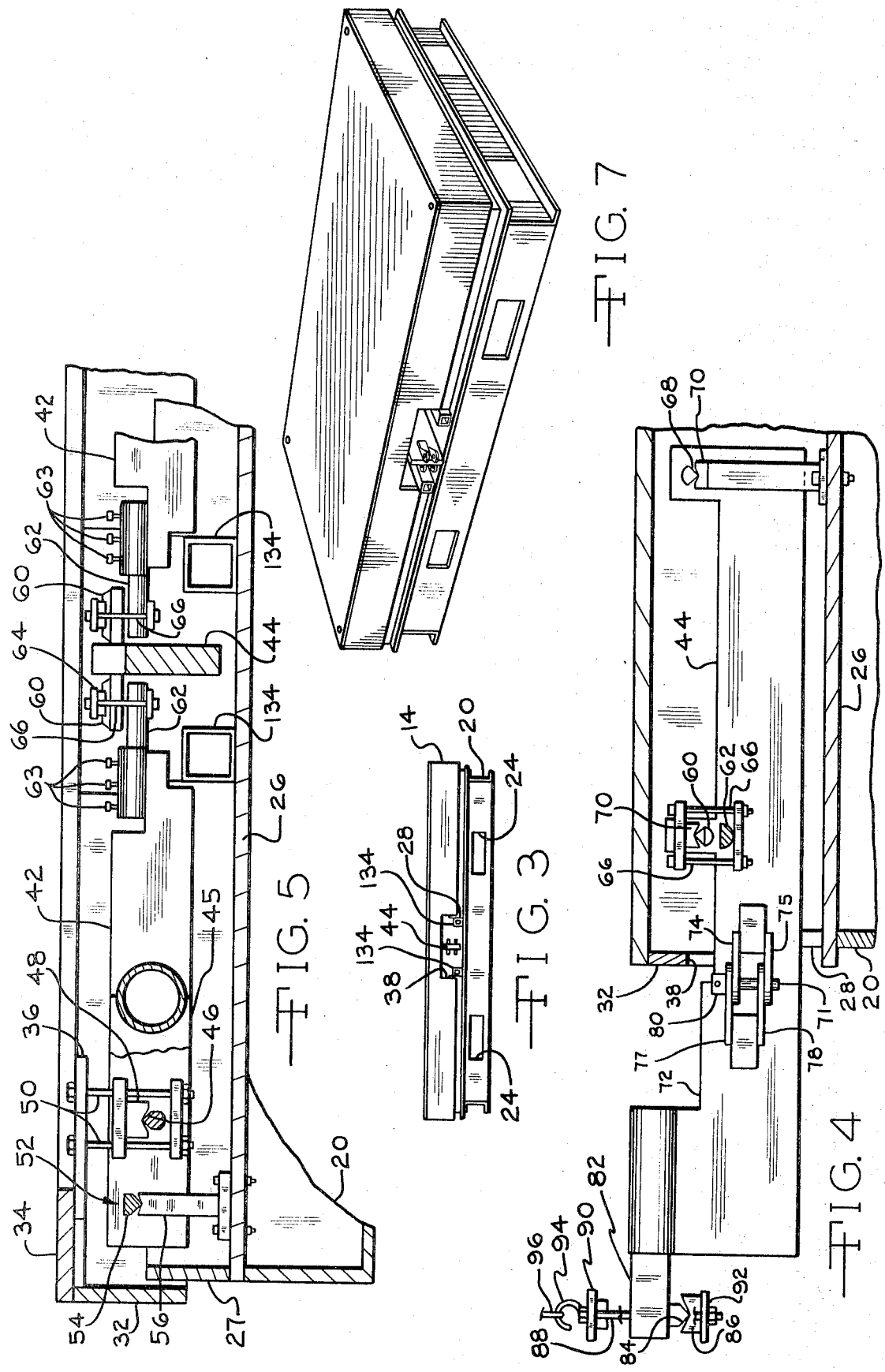

COLLAPSIBLE PLATFORM SCALE

BACKGROUND OF THE INVENTION

This invention pertains to platform scales and particularly to collapsible industrial platform scales adapted to be quickly disassembled and easily moved to another location for use.

Platform scales are widely used in industry and generally include a load receiving platform (live platform) operative with an internal lever system which transmits the weight force to a weight indicating means. The load receiving platform is typically supported by a plurality of load bearing points which activate the lever system which transmits the load to a single transfer lever extending laterally outwardly from the platform box. The transfer lever operatively interconnects with a vertically disposed connecting rod which activates the weight indicating means.

Although platform scales often require movement from one plant location to another, such scales are not well adapted for shipping. Assembled scales are awkward to handle as well as occupy an inordinate amount of space on commercial carriers. The bulky upright pillar connected to the large heavy platform box prevents stacking and typically only about 6 to 8 scales can be transported on a large flatbed truck. Platform scales can be shipped disassembled whereby the parts are shipped in a separate crate and then re-assembled on the job site. The foregoing practices are tedious, inefficient, and time consuming as well as being hazardous to the working parts of the scale.

It now has been found that a heavy duty industrial platform scale can be quickly collapsed and disassembled without disrupting the lever system inside of the platform in addition to utilizing the platform box as a compact and damage-proof shipping container for both the lever system and the disassembled parts.

Accordingly, a primary object of this invention is to provide a collapsible platform scale that can be quickly assembled and disassembled.

A further object is to provide a scale having a platform box for the lever system and adapted to contain disassembled parts during shipping to provide a sturdy shipping container.

A further object is to provide a collapsible platform scale having few working parts which can be disassembled without disturbing the lever system in the platform box.

Still a further object is to provide a split transfer lever whereby the working parts inside the platform box are disengaged from the weight indicating means but are not disengaged from the live platform.

A further object is to provide a simple locking means to inactivate the lever system and lock the live platform during shipping.

Still another object is to provide a lever system arranged within the platform box to provide maximum open space and accommodate the disassembled scale parts during shipping.

A further object is to utilize the platform box as a compact, sturdy shipping container adapted to be stacked for shipping purposes.

These and other advantages will become more apparent by referring to the drawings and the detailed description of the invention.

SUMMARY OF THE INVENTION

A collapsible platform scale having a lever system inside the platform adapted to be disconnected from levers outside the platform box by use of a split transfer lever whereby the upright assembly of working parts can be disengaged from the lever system in the platform box. The platform box is adapted to contain all disassembled parts and thereby function as a sturdy and compact shipping container. The scale further includes means for locking the live platform during shipment and means for stabilizing the live platform in use.

In the Drawings:

FIG. 1 is a side elevation view of the assembled scale of this invention;

FIG. 2 is a top plan view taken along lines 2—2 in FIG. 1 with the top plate removed to expose the interior of the platform box;

FIG. 3 is a front elevation view of the scale with the upright assembly removed;

FIG. 4 is a sectional elevation view taken along lines 4—4 in FIG. 2 and showing the transfer lever;

FIG. 5 is a sectional elevation view taken along lines 5—5 in FIG. 2;

FIG. 6 is an elevation view taken along lines 6—6 in FIG. 2; and

FIG. 7 is a perspective view of the collapsed scale self-contained within the platform box.

DETAILED DESCRIPTION OF THE INVENTION

Referring to the drawings wherein like reference characters designate like parts, shown is a collapsible platform scale 10 which includes a steel pallet understructure 12, a live platform 14, a dismountable upright assembly 16, and a weight indicating means 18.

The pallet understructure 12 is a four-sided pallet 20 which supports a steel platform box 22 adapted to contain the scale lever system. Each side of the pallet 20 has a pair of spaced openings 24 for accommodating two prongs of a power forklift truck (not shown). A steel plate 26 is secured to the top of the pallet 20 and functions as a floor 26 of the platform box 22. The underside of the pallet 20 is structurally re-inforced with an X-bracing member welded to the underside of steel plate floor 26 and the four junctures of the four-sided pallet 20 thereby structurally re-inforcing the pallet 20 to resist twisting and torsional stresses while transporting with a forklift truck. The steel plate 26 further reinforces the pallet 20 as well as provides a floor 26 for the platform box 22 and supports the scale lever system.

The platform box 22 includes upwardly extending wall members 27 located within downwardly depending sides 32 of live platform 14 whereby sides 32 enclose wall member 27 but are laterally spaced therefrom. The depending sides 32 each have a horizontally disposed upper ledge 34 adapted to peripherally support a removable steel plate top 30. The upper ledge members 34 are braced in each corner by angular bracing plates 36 welded to adjacent ledge members 34.

FIG. 2 shows the live platform 14 having the top plate 30 removed to expose the interior of the platform box 22 and the scale lever system contained therein. The steel foor 26 supports the weight bearing portion of the lever system which in turn supports the live platform 14 at four spaced load bearing points 35. Each of the four load bearing points 35 are disposed approximately below the angular brace plate 36 welded to the corners of ledge members 34. Each of the rearward load bearing points 35 are operatively interconnected with the forward load bearing point 35 on the same side by a torque lever 40. The torque levers 40 are tubular structural steel and particularly adapted to resist torsion or torque that may occur due to uneven distribution of heavy loads on the live platform 14. Each torque lever 40 is welded to a forwardly disposed transverse load lever 42 operatively interconnected to a transfer lever 44 whereby the load is accumulated and transferred outside the platform box 22 to activate the weight indicating means 18. FIGS. 3 and 4 show a frontal view of the scale indicating a centrally disposed opening 28 in the platform box 22 coinciding with an opening 38 in the live platform 14. The transfer lever 44 emerges from the platfrom box 22 through openings 28 and 38.

The four load bearing points 35 which support the live platform 14 are identical in construction and generally comprise an inverted knife edge 46 secured to a structural extension member 45 welded to the torque lever 40. The knife edge 46 operatively engages a load bearing block 48 and is maintained in engagement therewith by a plurality of bolts 50 attached to the angular bracing plate 36 disposed overhead and secured to the live platform 14. Disposed outwardly of the load bearing point 35 is a fulcrum point 52 comprising a fulcrum knife edge 54 welded to the structural extension member 45 and operatively engaging bearing block 56 which is securely anchored to the plate floor 26 of the platform box 22. Hence, the load carried on the live platform 14 is transmitted through each of the four load bearing points 35 by interaction with the fulcrum point 52 whereby each load bearing point 35 transmits a portion of the load to the transfer lever 44 via the torque levers 40 and the load levers 42.

Referring now to FIG. 4, the load is transmitted to the transfer lever 44 through a load bearing point represented by inverted knife edges 60 welded to the transfer lever 44 on both sides thereof. Each load lever 42 includes an extensible block member 62 secured to the load lever 42 by a plurality of tightening screws 63. The block members 62 activate the transfer lever 44 by inverted bearings 64 held in operative engagement with the knife edges 60 by four securing bolts 66. Disposed rearwardly of the transfer lever load bearing points 60 is a fulcrum point comprising knife edges 68 welded to both sides of the rearward portion of the transfer lever 44 and operatively engaging spaced support bearings 70 securely anchored to the floor 26 of the platform box 22 whereby the rearward portion of the transfer lever 44 is freely supported between the spaced bearings 70.

The transfer lever 44 extends forwardly and protrudes outwardly through centrally disposed openings 28 and 38 in the platform box 22 and live platform 14, respectively. Adjacent to the openings 28 and 38, the transfer lever 44 is provided with a split 71 whereby a removable lever portion 72 can be disassembled from the transfer lever 44. The removable portion 72 is adapted to be quickly disassembled from the transfer lever 44 which can remain in operative interconnection with the lever system contained within the platform box 22. A coupling means or quick-disconnect is provided for maintaining secure attachment of the removable lever 44 and includes a pair of vertically spaced steel bracket eyelets 74, 75 welded to the transfer lever 44 and adapted to mate with a similar pair of vertically spaced steel bracket 77, 78 welded to the removable portion 72. A quick-disconnect coupling is provided on both sides of the transfer lever 44 as best viewed in FIG. 2. The brackets 77, 78 are supported by brackets 74, 75 in conjunction with a locking pin 80 passing through eyelets 74, 75, 77, 78 which are matched so as to tightly engage the removable portion 72 against the transfer lever 44 at the split 71, as best viewed in FIG. 4.

The removable lever 72 extends forwardly and has secured thereto an arm 82 having a downwardly depending knife edge 84 adapted to engage a bearing member 86 thereby providing a vertical transfer point whereby the load is transferred vertically to the weight indicating means 18. The bearing 86 is held in operative engagement with the knife edge 84 by a plurality of bolts 88 secured to an upper block 90 and a lower block 92. The upper block 90 has secured thereto a hook 94 adapted to interconnect with a chain 96 or other steelyard connecting means. The uppermost link of the chain 96 is connected to a pair of U-members 98 each having a bearing block 100 engaging an inverted knife-edge 102 secured to either side of a conventionally operative steelyard beam 104. The beam 104 includes an intermediate knife edge 106 engaging a bearing 108 supported by an overhead structure 110 and a depending counterweight 112 suspended from the distal end of the steelyard beam 104 whereby the load on the live platform 14 can be measured in a conventional manner by the counterweight through pre-determined multiplication of levers. The steelyard beam 104 can be calibrated (not shown) or interconnected with electronic indicating means 114. The weight indicating means can be mechanical, hydraulic, or electrical as well known in the art.

The upwardly extending chain 96 can be quickly disconnected from the hook 94 and the pair of inverted knife edges 102 secured to either side of the steelyard beam 104 by merely collapsing or removing the tension in the stretched chain 96 and then removing the bearings 100 from the knife edges 102. The transfer lever 44 can be disassembled by disconnecting the removable portion 72 at split 71 thereby leaving lever 44 in operative engagement with the lever system contained in the platform box 22.

The overhead support structure 110 for supporting the weight indicating means 18 includes a hollow circular base member 116 adapted to fit within a turret 118 whereby the overhead structure 110 can be rotated within the turret 118 as well as quickly disassembled therefrom. The turret 118 is secured to a vertical column 119 represented by a plurality of leg members 120 which are welded to a lower peripheral structural member 122 to brace the legs 120. The structural member 122 has welded thereto a plurality of downwardly depending tubular steel legs 124 adapted to be inserted into vertically disposed tubular steel sleeve members 126 secured to a base member 128. The base member 128 includes a forwardly disposed leg 130 for resting on the ground or floor and a pair of horizontal structural members 132 interconnecting with the platform box 22 by insertion within the elongated tubular members 134 secured to the floor 26 of the platform box 22 on either side of the transfer lever 44. Accordingly, the upright assembly 16 can be quickly disassembled by first removing the overhead structure 110 at the base 116 and turret 118; then removing the vertical column 119 by withdrawing legs 124 from sleeves 126; and thereafter removing the base 128 by withdrawing horizontal members 132 from tubular members 134.

The disassembled parts can be placed within the space provided between torque levers 40 in the platform box 22 whereby the platform box 22 can be utilized as a compact and sturdy shipping container. As best viewed in FIG. 2, the lever system is advantageously arranged within the platform box 22 by the spaced parallel torque levers 40 and forwardly disposed load levers 42 whereby maximum open space is provided within the platform box 22.

Prior to shipping, the live platform 14 is locked by a locking means 140, shown in FIG. 6, interconnecting the live platform 14 to the floor 26 of the platform box 22 thereby rendering the live platform 14 immovable during shipment. The locking means comprises a bolt 142 engaging a bracket 144 secured to the live platform 14 and a threaded connection with a threaded nut 146 welded to a bracket 148 secured to the floor 26. The nut 146 is spaced from the floor 26 to permit the bolt 142 to be tightened downwardly until the knife edges and bearings of the lever system are rendered immovable thereby protecting the same during shipment. The top 30 is secured to the top of the live platform 14 whereby all the disassembled parts are self-contained within the platform to provide a compact shipping container as best viewed in FIG. 7.

The scale 10 can be quickly reassembled on the job site by removing the disassembled parts from the platform box 22 and reassembling the same as hereinbefore described. The removable transfer lever portion 72 is reassembled to the transfer lever 44 by matching eyelets 74, 75, 77, 78 and inserting the locking pin 80 whereby transfer lever 44 functions as a single lever. The base 128 is assembled by inserting horizontal members 132 in tubular members 134; the vertical column is installed by locating legs 124 in sleeves 126; and the overhead structure 110 is installed by fitting the base 116 in the turret 118. The transfer lever 44 is reassembled with the steelyard beam 104 by interconnecting the lowermost link of the chain 96 with hook 94 and engaging bearings 100 of the upper U-members 98 with the knife edges 102 on either side of the steelyard beam 104.

The locking means 140 is loosened to freely permit operative interaction between the knife edges and the bearings of the lever system. The bolt 142 is loosened upwardly but is not disengaged from the bracket 144 and the nut 146. The bolt 142 functions as a stabilizing means during use of the scale 10 to effectively protect the live platform 14 from a sudden jar which otherwise could dislodge the platform 14 from the lever system.

The foregoing is descriptive of the preferred embodiment of the collapsible scale of this invention that can be quickly assembled and disassembled wherein the disassembled parts can be advantageously self-contained within the platform box which functions as a compact structural shipping crate. The preferred embodiment is not intended to be limiting except by the appended claims.

I claim:

1. A collapsible platform scale, comprising:
    a live platform for supporting the weight to be weighed;
    an operative lever system having a plurality of load bearing points supporting the live platform;
    said lever system including a transfer lever for transferring the accumulative load to a weight indicating means;
    a platform box understructure supporting said lever system and having a forwardly disposed opening wherein said transfer lever protrudes from the platform box;
    said transfer lever being split proximate to said opening providing a removable lever portion of said transfer lever outside said box;
    coupling means for locking said removable lever portion to said transfer lever;
    said removable lever portion operatively interconnected to weight indicating means and adapted to be disconnected therefrom whereby the weight indicating means and transfer lever can be disassembled from the lever system contained within the platform box.

2. The collapsible scale in claim 1 wherein the coupling means for locking the removable lever portion to the transfer lever comprises a plurality of eyelet brackets secured to said removable lever portion, a plurality of mating eyelet brackets secured to said transfer, and locking pin means for locking the eyelet brackets to said mating eyelet brackets.

3. The collapsible scale in claim 1 wherein the lever system comprises a pair of spaced torque levers, each said torque lever operatively interconnected to a forward and a rearward load bearing point, each said torque lever secured to a forwardly disposed transverse load lever, each said load lever operatively engaging said transfer lever whereby the load is accumulated and transferred by said transfer lever.

4. The collapsible scale in claim 1 wherein the platform box is supported by a steel pallet whereby the scale is adapted to be lifted by a power forklift truck.

5. The collapsible scale in claim 1 wherein the live platform has a removable top to expose the interior of the platform box, and said weight indicating means and transfer lever are disassembled and contained within said platform box.

6. The collapsible scale in claim 1 wherein the weight indicating means is supported by an upright assembly adapted to be disassembled.

7. The collapsible scale in claim 6 wherein the upright assembly comprises a base member interconnected to said platform box and a column structure supported by said base, said base adapted to be disassembled from both the platform box and the column structure.

8. The collapsible scale in claim 1 wherein the live platform includes locking means interconnected to the live platform and the platform box for locking the live platform.

9. The collapsible scale in claim 8 wherein the locking means is an adjustable bolt means adapted to be a stabilizing means.

* * * * *